March 11, 1930.                 C. Y. KNIGHT                    1,750,320
              METALLIC PACKING AND METHOD OF CONSTRUCTION
                            Filed Oct. 6. 1922

Inventor
Charles Y. Knight
By his Attorney

Patented Mar. 11, 1930

1,750,320

UNITED STATES PATENT OFFICE

CHARLES Y. KNIGHT, OF PASADENA, CALIFORNIA, ASSIGNOR TO KNIGHT AMERICAN PATENTS COMPANY, OF CHICAGO, ILLINOIS, A CORPORATION OF DELAWARE

METALLIC PACKING AND METHOD OF CONSTRUCTION

Application filed October 6, 1922. Serial No. 592,912.

The present invention relates to a broad, novel type of metallic packing ring or bushing such as a piston ring, "junk" ring, bushing or the like, made of a plurality of segmental metallic elements, and to a novel means for retaining the metallic packing, such as a piston ring, in assembled position in the use to which the invention is put, together with a method of assembly thereof.

It is an object of the present invention to provide a metallic packing of the character indicated made in such a manner as to automatically adapt the packing to the surfaces with which the same comes in contact without necessitating any expansion or contraction of the metal forming the ring, packing or bushing, and which may have a capacity for minutely adjusting itself in use, rendered possible by the construction of the same in segmental portions.

A further object of the invention is to provide in a piston ring, for example, a combination of ring and a ring retaining means whereby the retaining means may effectively coöperate with the ring, per se, or the segments thereof to prevent gas and oil passage.

A further object of the invention is to provide a type of ring in which the thickness thereof, and hence the strength, may be made as desired without affecting either the assembly of the ring on a piston for example, or the proper "expansion" of the ring in contact with the cylinder or sleeve, or other surface with respect to which the piston moves.

A further object of the invention is to construct a metallic packing of the character indicated which can be designed of any size in normal position, without regard to the effect upon the means for retaining the ring in position or without any interference whatever with the capacity of the ring to effectively seal against the passage of gas between two relatively moving surfaces such as a piston and cylinder or sleeve.

A further object of the invention is to provide an effective means for retaining the ring referred to in position and to also provide such retaining means, or the piston itself for example with means to coöperate with the ring to prevent the passage of gas between the piston and cylinder or sleeve if the invention be adopted to this use.

The invention has for its further object a novel method of constructing a metallic packing or piston ring for example and a method of assembly of the parts in operative position.

Various other objects are within the scope of this invention such as relate to the arrangement of the related elements or the structure, and to various details of construction and to economies of manufacture and numerous other features as will be apparent from consideration of the drawing and related description of a form of the invention, which may be preferred, in which—

Figure 2:
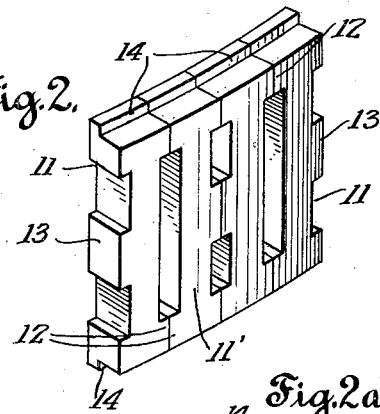
Fig. 2 is an isometric view of a plurality of segments adapted to form one embodiment of the present invention.

Fig. 2ª is a similar view with different segments and projections.

Figure 3:
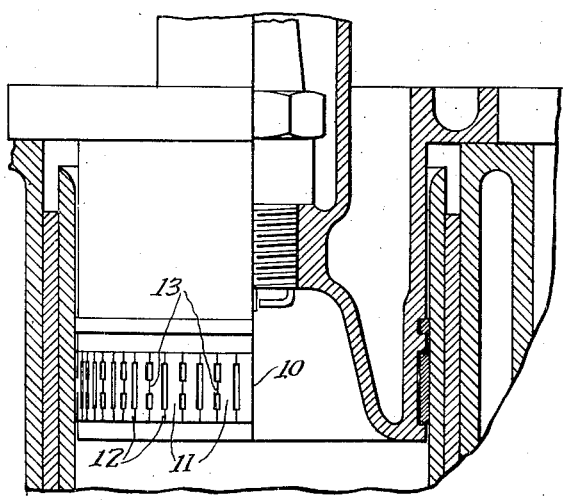
Figure 2A:
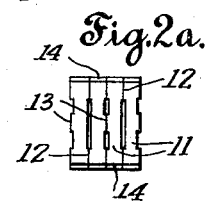

Fig. 3 is a sectional view showing the application of the invention to a "junk" ring.

Figure 1:
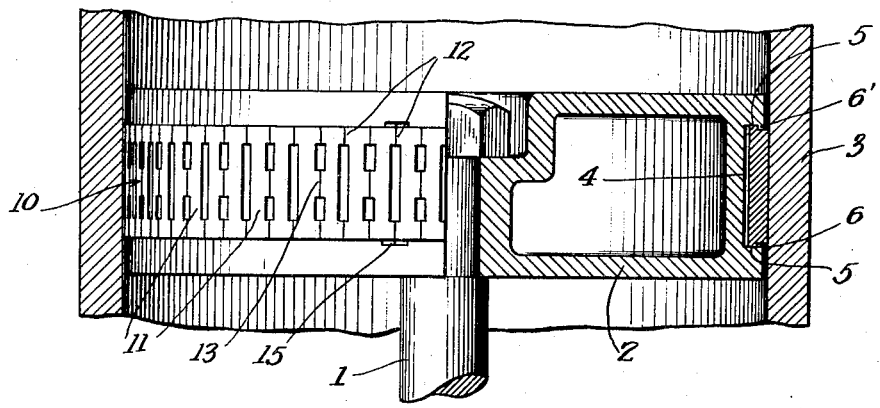
Fig. 1 is a view partly in section and partly in elevation showing one adaptation of the present invention.

Referring to Fig. 1, there is illustrated a piston rod 1 with a piston 2, adapted to reciprocate in a cylinder 3. In carrying out the present invention in this embodiment thereof I have provided the piston 2 with an annular recess 4, having an under-cut portion 5 at the top and bottom of the groove 4 to form overhanging ledges 6 and 6'. I have found in practice that the metal may be undercut, at 4 for example, about one thirty-second of an inch, (1/32") although the amount may be varied as found expedient.

The segmental piston ring is illustrated at 10 and is composed in the embodiment illustrated herein, of a plurality of arc-shaped individual segments 11, formed as shown in Fig. 2, provided on both sides with laterally extending lugs 12 at the top and bottom thereof and with a central boss or projection 13. It will be noted that the adjacent segment 11' has the projection 12 abutting the projection 12 of the segment first referred to and the projections 13 thereof are turned in the opposite directions as illustrated. Pairs of these segments are assembled as indicated and in practice I have found that each segment may be provided with a space at the spaced portions thereof of .002″ although again it is apparent that the actual amounts may be varied in practice. At the top and bottom of each of the segments 11 and 11′ there is a cut-away portion 14 arranged so that the segments will exactly fit the groove 4 with the undercut portion 5 and ledges 6 and 6′ of the piston 2 as will be apparent. It will be noted that the overhanging ledges 6 and 6′ may be cut away as indicated at 15 for a width equal to the outside width of each of the segments 11 and 11′ and the segmental ring is assembled in the groove 4 by threading the same into the groove through this cut away portion until a sufficient number of segments have been inserted in the groove to completely fill the same and form a complete ring assembled on the piston tube. The segments may then be slid around the groove a distance of approximately half the width of an individual segment so that the joint between two segments will come between the side edges of the cut away portion 15. In this manner there will be no opportunity for the individual segments to become loose when assembled on a piston and the piston may then be inserted in the cylinder. It will be apparent that in use if there is any tendency for a segment to come exactly opposite the cut away portion 15 the same can not move upwardly or downwardly by reason of the top and bottom edges of the groove 4 or undercut portion 5 and that the cylinder or contacting surface will hold the same in position.

In addition, however, regardless of the contact with a cylinder or sleeve wall the arc-shaped segmental portions 11 and 11′ are so formed as when properly assembled to form a ring in which there is a more or less wedging action which will entirely prevent any segment from being dislocated from the piston groove 4, even if the same were exactly opposite a cut-out portion 15 of the ledges 6 and 6′.

The individual segments for a given size "junk" ring, piston ring or other metallic packing may first be made into a ring shape on a jig or other assembling and forming machine or tool, so that the diameter of the ring may be properly determined and may be gauged by the diameter of the cylinder in which the piston moves, for example, and may be made to fit as close as desired in practice.

When assembled it will be seen that the segmental packing or piston ring may readily adapt itself in use to any possible irregularities of surface in which the piston moves or on the sleeve in the case of the use of a "junk" ring, which is illustrated in Fig. 3. It will also be noted that in practice the oil between the piston and the cylinder or the piston and the sleeve, will enter into the ring groove and between all the segmental portions and form an added pressure means to maintain the parts in extremely accurate operating position. It will also be seen that gas is effectively prevented from escaping past the ring by reason of the overhanging ledge 6 and abutting projections 12 at the top on the one hand and the bottom abutting projections 12 on the other hand, the abutments 13 operating as a brace and in this connection the piston ring retaining means produces a broad novel feature of additionally effectively cooperating in preventing the passage of gas as well as retaining the segmental ring in position. It will be further noted that a certain amount of movement toward and away from the center of the segmental piston ring is permitted for each individual segment to cooperate in the adaptation of the same to any possible irregularities to which the segmental ring adapts itself in use. It will also be noted that by the employment of a plurality of segments, a full side contact will always be maintained between the ring and one of the relatively moving surfaces, in contradistinction to edge contact, which tends to wear and mar the surface with which the ring contacts.

It will be also noted that when the segmental ring is assembled on a piston when the same is in the position which it normally assumes when the piston is assembled in the cylinder and in the assembly thereof, there is no need of any distortion or springing of the ring in the assembly of the piston in the cylinder.

It is apparent that, within the spirit of the invention modifications and different arrangements may be made other than as herein disclosed and the present disclosure is illustrative merely, the invention comprehending all variations thereof.

I claim:

1. A packing ring for use in preventing passage of gas or the like between two surfaces or parts composed of a plurality of inflexible elements abutting against each other and carried directly by one of said parts and maintained against the other part solely by the abutment of said elements.

2. A packing ring of the character indicated including a plurality of individual separate arc-shaped elements adapted to abut against each other to form a complete ring and to be carried directly by one of two relatively moving parts and to be maintained against the other part solely by the abutment of said elements.

3. A packing ring of the character described comprising a plurality of separate individual arc-shaped segments having spaced abutting surfaces on portions of the length thereof on one of the faces thereof and being cut away at the ends thereof on another face thereof to cooperate with retaining means on the part to which the ring is assembled.

4. A packing ring retaining member having an annular groove therein with a retaining ledge at an edge thereof in combination with a packing ring of the character described comprising a plurality of separate individual arc-shaped segments having spaced abutting surfaces and being cut away at an edge thereof to cooperate with the retaining ledge on the member, the segmental ring adapted to extend beyond the surface of said member, the relative depth of said groove and the size and arrangement of the segments arranged to permit adjustment of the segmental ring to the surface with which said member may have relative movement.

5. In combination, a piston having an annular groove therein, an overhanging ledge on the outside of said groove and a piston ring composed of a plurality of relatively small abutting segments located in said groove having a cut away portion in which said ledge engages, said ring extending outwardly beyond the wall of said piston and said segments resisting inward radial movement solely by the abutment against each other.

6. In combination, a piston having an annular groove therearound, an overhanging ledge on the outside of said groove at the opposite edges thereof and a piston ring composed of a plurality of arc shaped segments in said groove, said edges being cut away at a portion thereof to permit insertion of said segments.

7. In a device of the character indicated, the combination of a piston and a packing ring comprising relatively small inflexible segments abutting against each other, of means on said piston for retaining said ring in place and cooperating with said ring to prevent passage of gas between said ring and a surface contacting therewith, said ring being maintained against said surface solely by the abutment of said segments.

8. In combination, a packing ring retaining member having an annular groove therein with an undercut portion at the opposite walls thereof to form opposite ledges, a segmental packing ring adapted to fit in said groove and having portions adapted to engage said ledges, each of said ledges being cut away for a width equal to the width of a segment to permit insertion of said segments in said groove.

9. A method of assembling a plurality of segments on a piston which consists in first fitting a plurality of segments of various sizes on a jig of the required size corresponding to the size of the cylinder in which the piston operates until a group of segments having the desired circumference is found, and then sliding said segments in a piston retaining groove in said piston through a suitable segment inserting opening therein.

10. The combination with a piston having a groove therein of a plurality of arcuate segments positioned on said groove and projecting beyond the surface of said piston, said segments having spaced abutments on their lateral faces adapted to engage each other, and means for retaining said segments in the groove.

11. The combination with a piston having a groove therein, of a plurality of arcuate segments positioned in said groove and projecting beyond the surface of said piston, said segments having spaced abutments at the upper and lower ends of their lateral faces, which abutments are adapted to engage each other, and means for retaining said segments in the groove.

12. The combination with a piston having a groove therein, of a plurality of arcuate segments positioned in said groove and projecting beyond the surface of said piston, said segments having spaced abutments at the upper and lower ends of their lateral faces, and having a central abutment projecting from the central portion of one lateral face, said segments being arranged in the groove with said abutments in engagement with each other, and means for retaining said segments in the groove.

In testimony whereof, I affix my signature.

CHARLES Y. KNIGHT.